(12) United States Patent
Radatus et al.

(10) Patent No.: US 7,258,196 B2
(45) Date of Patent: Aug. 21, 2007

(54) NOISE ATTENUATOR WITH LATERALLY MOVING BAFFLES

(75) Inventors: Herms Radatus, Kitchener (CA); Ramin Shahkavoosi, Mississauga (CA)

(73) Assignee: J.P. Environmental Products Inc., Guelph, Ontario (CA)

( * ) Notice: Subject to any disclaimer, the term of this patent is extended or adjusted under 35 U.S.C. 154(b) by 97 days.

(21) Appl. No.: 11/159,383

(22) Filed: Jun. 23, 2005

(65) Prior Publication Data

US 2006/0144638 A1    Jul. 6, 2006

(30) Foreign Application Priority Data

Jan. 6, 2005   (CA)  ................................. 2491817

(51) Int. Cl.
    *E04F 17/04*     (2006.01)
    *F01N 1/16*     (2006.01)
    *F15D 1/04*     (2006.01)
    *E04B 1/343*     (2006.01)

(52) U.S. Cl. ..................... 181/224; 181/271; 181/277; 181/287; 138/39

(58) Field of Classification Search ................ 181/224, 181/225, 287, 210, 278; 138/39
See application file for complete search history.

(56) References Cited

U.S. PATENT DOCUMENTS

| | | | | | |
|---|---|---|---|---|---|
| 2,085,436 | A | * | 6/1937 | Maurer | 160/229.1 |
| 2,124,801 | A | * | 7/1938 | Van Alsburg | 454/316 |
| 3,219,143 | A | * | 11/1965 | Bohanon | 181/224 |
| 3,348,628 | A | * | 10/1967 | Dixon et al. | 181/287 |
| 3,604,530 | A | * | 9/1971 | Duthion et al. | 181/210 |
| 4,249,571 | A | * | 2/1981 | McNabney | 137/601.06 |
| 4,276,954 | A | * | 7/1981 | Romano | 181/224 |
| 4,316,522 | A | * | 2/1982 | Hirschorn | 181/224 |
| 4,887,522 | A | * | 12/1989 | Kuno et al. | 454/309 |
| 5,250,764 | A | | 10/1993 | Doychak et al. | |
| 5,260,523 | A | * | 11/1993 | Pettersson et al. | 181/224 |
| 5,268,541 | A | * | 12/1993 | Pettersson | 181/224 |
| 5,696,361 | A | * | 12/1997 | Chen | 181/224 |
| 5,728,980 | A | * | 3/1998 | Zarnick | 181/224 |
| 5,817,990 | A | * | 10/1998 | Furse | 181/224 |
| 5,924,300 | A | | 7/1999 | Fromm et al. | |
| 6,260,658 | B1 | | 7/2001 | Darrell et al. | |
| 6,782,971 | B2 | | 8/2004 | Dutton et al. | |

FOREIGN PATENT DOCUMENTS

DE               3425450 A1 *    4/1985

OTHER PUBLICATIONS

Canadian Patent Office, Examiner's Report, Nov. 29, 2005.

\* cited by examiner

*Primary Examiner*—Edgardo San Martin
(74) *Attorney, Agent, or Firm*—Neil Henderson (57) ABSTRACT

A silencer or sound attenuator for gas flows that makes use of noise baffles is provided with a lateral movement mechanism which allows the baffles to be moved perpendicular to the direction of the gas flow within the silencer. A silencer provided with the lateral movement mechanism allows personnel to have access to the interior of the silencer so that the baffles can be cleaned without having to remove the baffles from the silencer. The lateral movement mechanism may include a roller assembly installed at the top of each baffle which operates within a corresponding track that is provided to the inner upper surface of the housing. The lateral movement mechanism may also include a caster assembly, which is provided to the bottom of each baffle to aid in lateral movement.

16 Claims, 9 Drawing Sheets

FIG. 7

NOISE ATTENUATOR WITH LATERALLY MOVING BAFFLES

FIELD OF THE INVENTION

The present invention relates generally to a noise attenuator, typically called a silencer, for use in situations involving gaseous flow, and in particular, in larger scale silencers for air vents and the like. More particularly, the present invention relates to a noise attenuator with laterally moving baffles.

BACKGROUND OF THE INVENTION

In various industries and in various public developments, such as subways, underground tunnels for highways, trains, and other applications, or the like, there are situations in which flows of gases can result in a large amount of noise being generated.

Conventionally, the noise that is generated is reduced by the use of noise control devices, called noise attenuators or silencers. One form of silencer includes a series of baffles arranged in spaced relation parallel to the flow of gas through the system. This type of silencer is sometimes referred to as a splitter-type of silencer in that the baffles split the gas as it flows through the silencer. The baffles are typically constructed as a panel having two perforated surfaces which contain a noise absorbent material, such as foam, mineral wool, fiber glass, basalt wool, or the like therebetween.

During operation, as the air moves through the silencer, the noise generated is absorbed into the baffles. Typically, these baffles will also absorb dust or particulate matter that may be present in the airflow. The accumulation of dust or particulate matter on the baffles reduces their sound/noise damping qualities. As such, it is necessary to periodically clean the baffles to ensure that they continue to operate efficiently.

In conventional systems, the baffles are typically removed from the silencer in order to be cleaned, typically by sliding out through one of the openings through which air flows. The removal of the baffles can be difficult because silencers are often installed in a confined space and, in larger silencers, can be a particular problem because of the size and weight of each of the baffles. Depending on the size of the silencer and application, individual baffles can weigh over 200 kg. Further, when cleaning the baffles some care must be taken because the noise absorbent material in the baffles can be compromised if not handled properly.

Thus, there is a need for an improved silencer in which the baffles can be cleaned efficiently and economically.

SUMMARY OF THE INVENTION

In order to overcome at least some of the above problems, a silencer or noise attenuator according to an embodiment of the invention is provided with a lateral movement mechanism which allows the baffles to be moved perpendicular to the direction of the gas flow within the silencer. A silencer provided with the lateral movement mechanism allows personnel to have access to the interior of the silencer so that the baffles can be cleaned without having to remove the baffles from the silencer.

More particularly, according to one aspect of the invention, there is provided a noise attenuator that includes a housing, which forms front and back openings through which gas flows, one or more baffles mounted within the housing generally parallel with the direction of gas flow, and a lateral movement mechanism connected to the housing and the baffles to allow at least one of the baffles to move perpendicular to the direction of gas flow.

The lateral movement mechanism preferably includes a track mounted in the housing and running perpendicular to the direction of gas flow and a roller assembly mounted on each of the baffles to engage the track so that the baffles can move laterally. The lateral movement mechanism may also include a caster assembly provided at a base of the baffles.

According to another aspect of the invention, there is provided a noise attenuator for gas flows that includes: a housing that forms front and back openings through which the gas flows; one or more baffles provided within said housing, the one or more baffles arranged generally parallel to the direction of gas flow; a track mounted to an inner upper surface of the housing, the track running perpendicular to the direction of gas flow; a roller assembly mounted on each of the one or more baffles to rollingly engage the track; a caster assembly provided at a base of the one or more baffles; and a locking mechanism to prevent the one or more baffles from moving during operation of the noise attenuator, wherein, when the locking mechanism is disengaged, the one or more baffles can move within the housing in a direction perpendicular to the direction of gas flow.

DETAILED DESCRIPTION OF THE INVENTION

The following description refers to a silencer according to an embodiment of the invention that is intended for use in an air flow from a subway system. However, one of skill in the art will realize that embodiments may be adapted to various different types of air flow or gaseous flow.

Figure 1:
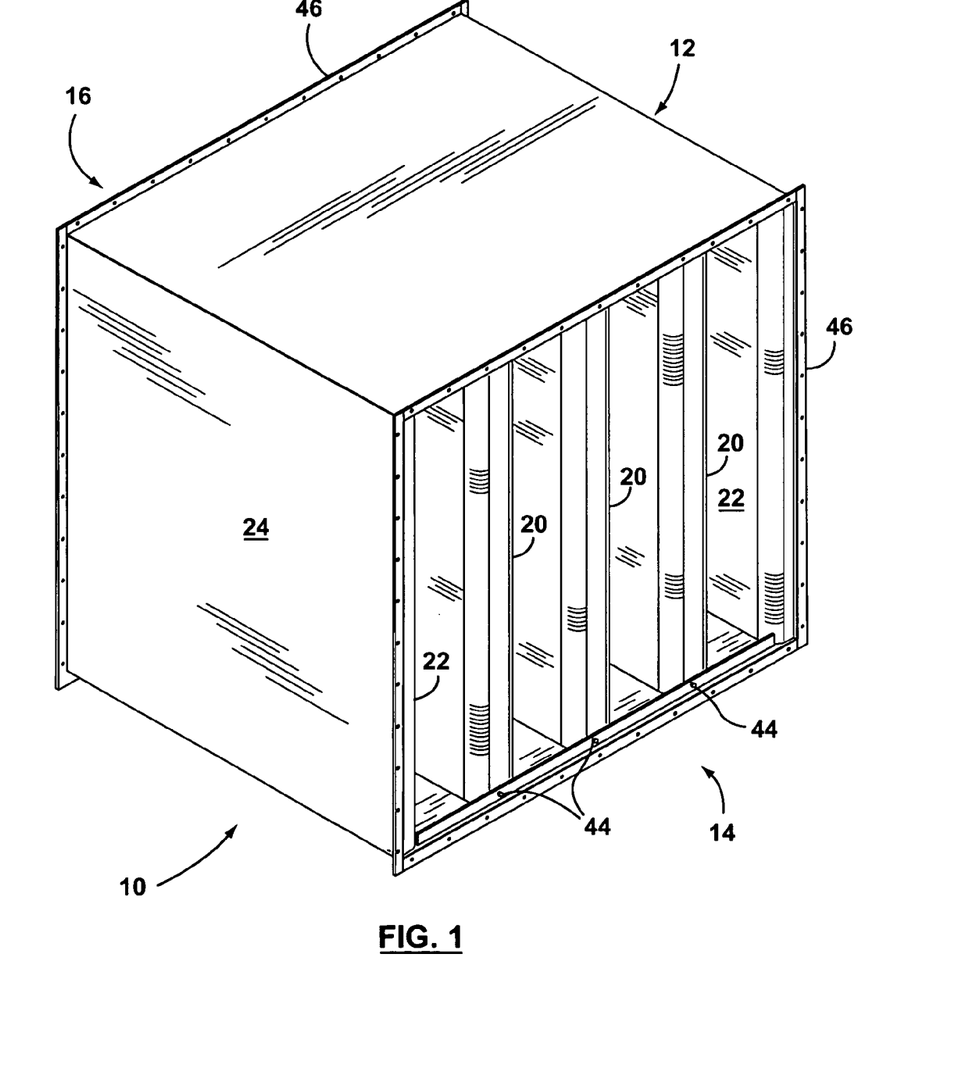
FIG. 1 is a perspective view of a silencer according to an embodiment of the invention.

FIG. 1 is a perspective view of a silencer 10 according to an embodiment of the invention. The silencer 10 includes a housing 12 which is designed to be fitted within or, depending on the application, as a module/component of a duct or air flow system (not shown) through which air flows. In this particular embodiment, the housing 12 is approximately rectangular in shape. The housing 12 is provided with a front opening 14 and a back opening 16 to allow air to flow through.

The housing 12 houses baffles 20 which are arranged generally parallel to the direction of air flow, and are arranged in spaced relation to each other. It will be understood that the number of baffles 20 and baffle spacing may be varied depending on the size of silencer 10 or on the particular application. Further, the housing 12 may also include side baffles 22 which are affixed to side walls 24 of the housing 12.

Figure 2:
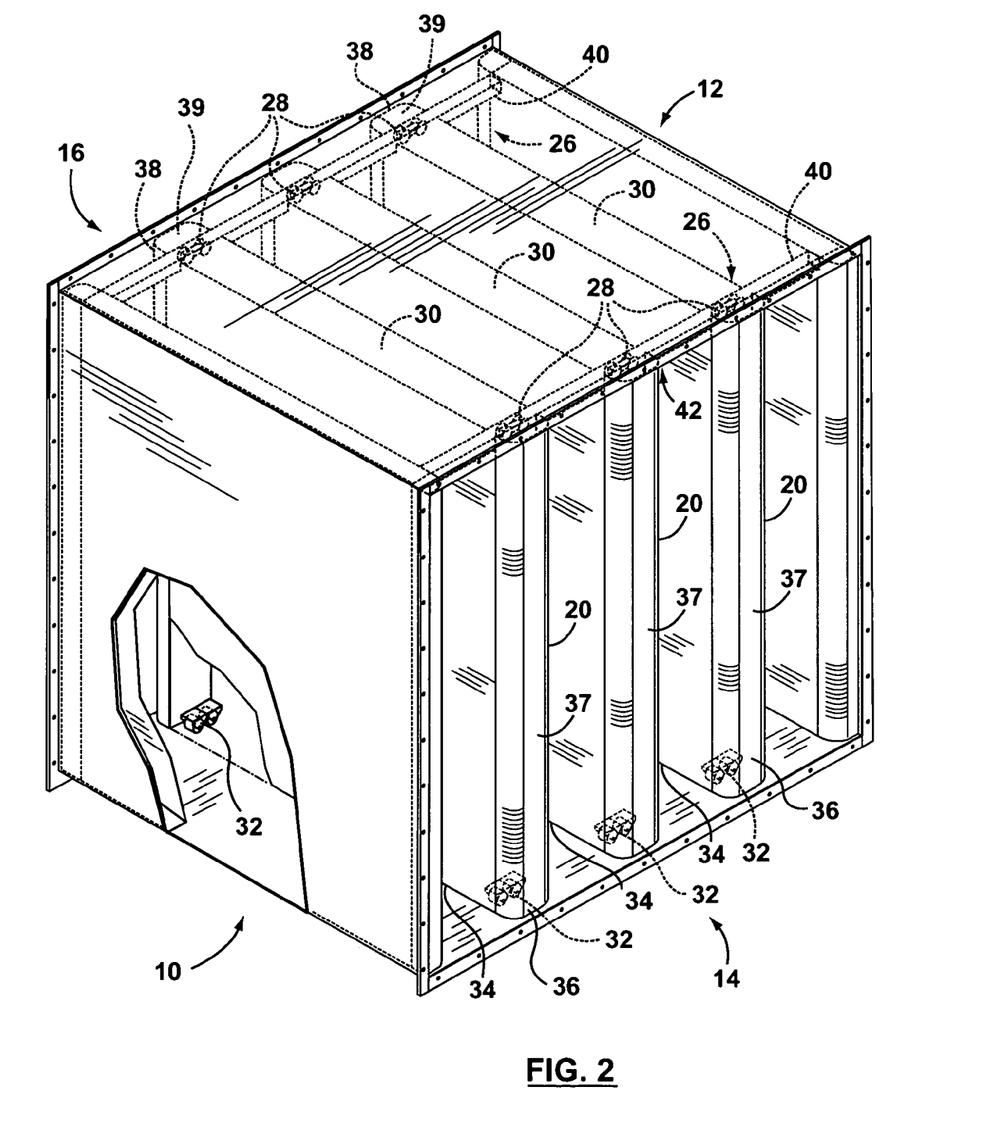
FIG. 2 is a perspective view of the silencer shown in FIG. 1 with hidden lines showing a lateral movement mechanism.

FIG. 2 is a perspective view of the silencer 10 with hidden lines showing elements of a lateral movement mechanism 26 provided in the silencer 10. In this embodiment, the lateral movement mechanism 26 includes roller assemblies 28 mounted at an upper portion 30 of each baffle 20 and caster assemblies 32 mounted at a lower portion 34 of each baffle 20. In particular, a roller assembly 28 and a caster assembly 32 are mounted at each of a front end 36 and a back end 38 of each baffle 20. In this embodiment, the baffles 20 each include a rounded or tapered front cap 37 mounted on the front end 36 and a rounded or tapered back cap 39 mounted on the back end 38 to assist with air flow around the baffles 20.

The roller assemblies 28 on the baffles 20 engage with tracks 40 located on an inner upper surface 42 of the housing 12. In this embodiment, the tracks 40 are arranged within the housing 12 adjacent to the front and back openings 14, 16 perpendicular to the direction of air flow.

It is preferable that each of the baffles 20 be locked in position during operation of the silencer 10. As shown in FIG. 1, each of the baffles 20 can be locked by a bolt 44 which passes through the housing 12 and engages the baffle 20. It will be understood that other locking mechanisms may also be used to keep the baffles 20 in place during operation.

Further, as shown in FIGS. 1 and 2, the housing 12 may be provided with flanges 46 around the openings 14, 16 to allow the attachment of a safety grating (not shown) to prevent access to the silencer 10 by people or pieces of debris, or alternatively, to allow the attachment of additional silencer modules (not shown in FIG. 1 or 2) as described in more detail below.

The provision of a lateral movement mechanism 26 to the silencer 10 allows the baffles 20 to be moved laterally within the housing 12 such that personnel will have access to the interior of the housing 12 to clean the baffles 20 in situ, that is, the baffles 20 may be cleaned without having to remove the baffles 20 from the housing 12.

Figure 3A:
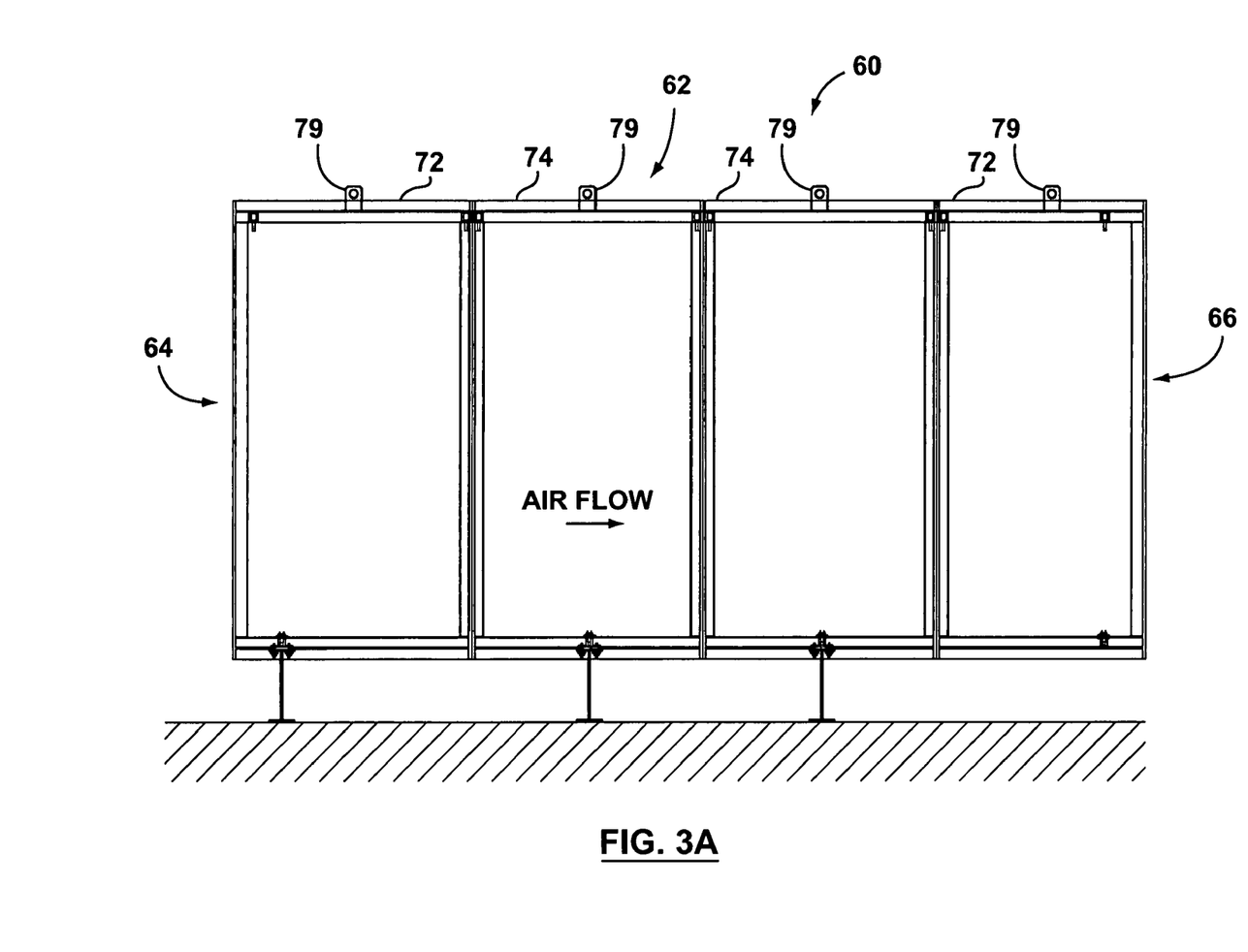
FIGS. 3A, 3B, and 3C show front, top and side views of another silencer according to an embodiment of the invention.
Figure 3B:
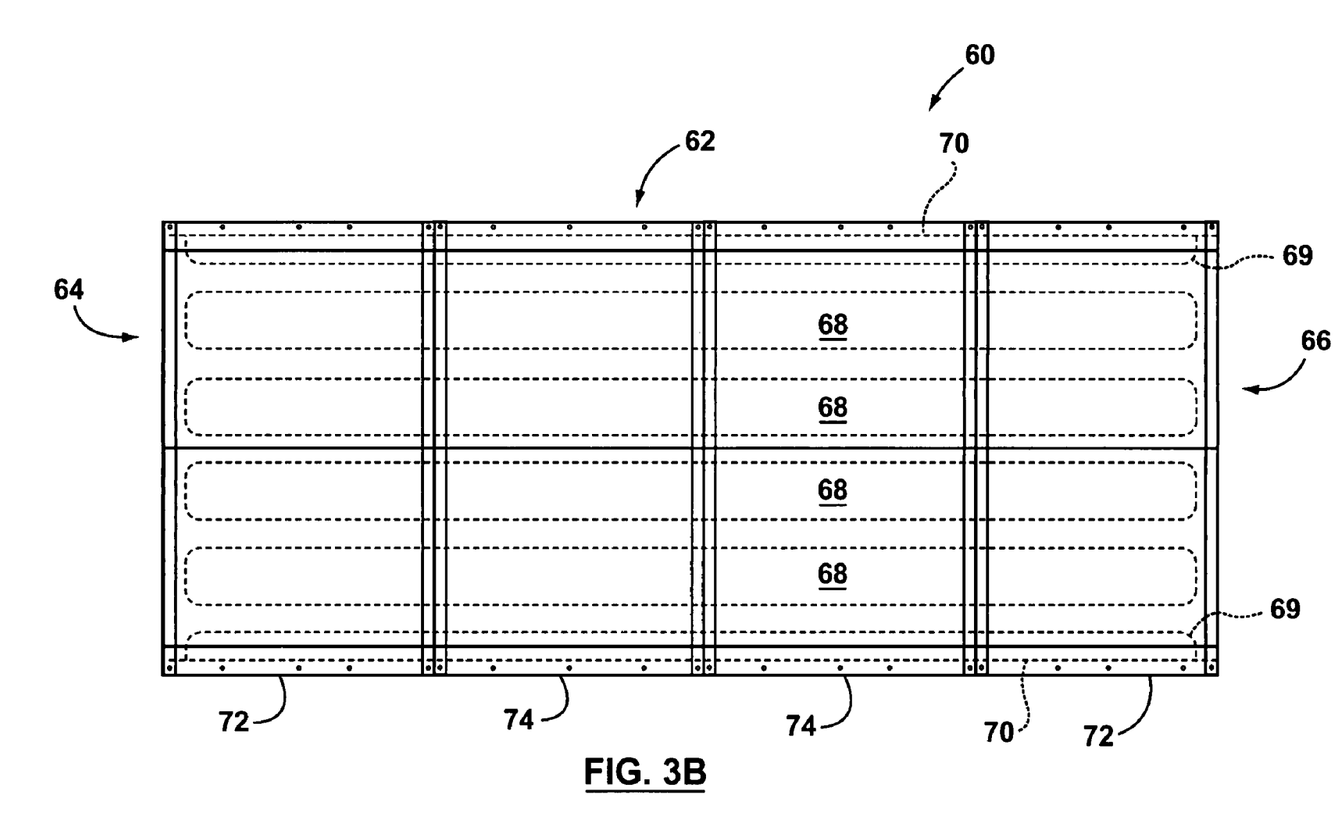
Figure 3C:
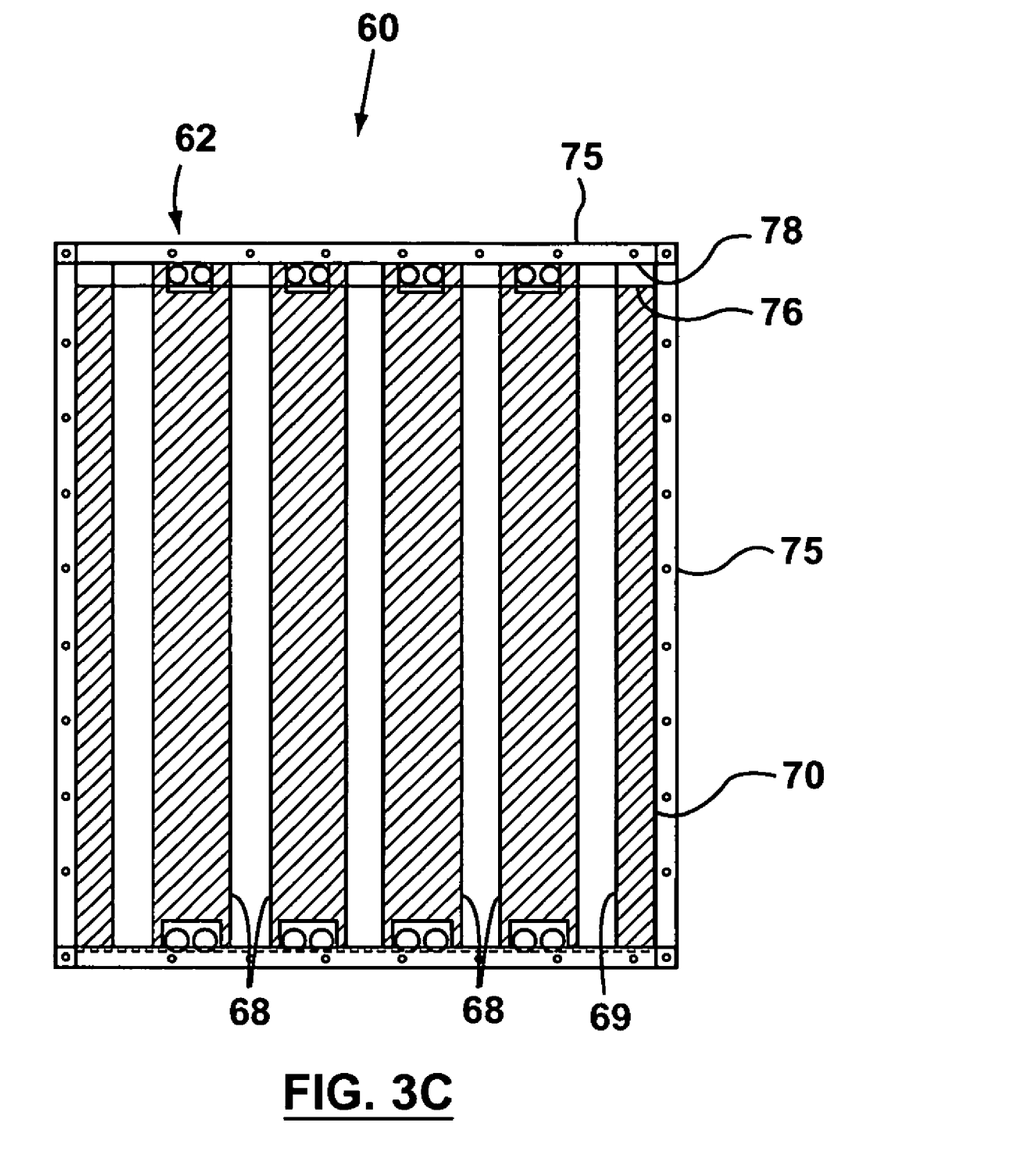

FIGS. 3A, 38, and 3C show front, top and side views of another silencer 60 according to an embodiment of the invention. Similar to the embodiment above, a housing 62 houses baffles 68 (see FIGS. 3B and 3C) which are arranged generally parallel to the direction of airflow and are in spaced relation to each other. The housing 62 also includes two side baffles 69, which are placed adjacent to side walls 70 of the housing 62.

As can be seen in FIGS. 3A, 3B and 3C, the silencer 60 is designed to be modular, such that the housing 62 includes two end modules 72 and two middle modules 74, so that an appropriate size silencer 60 can be selected or constructed for various types of applications. The housing 62 may be formed by connecting the modules 72, 74 using flanges 75. In order to achieve this modularity, the baffles 68 are also constructed in a modular fashion so baffle modules can be connected together to match the housing modules for a particular application.

As in the embodiment above, each housing module 72, 74 includes a front opening 64 and a back opening 66 to allow air to flow through. As shown in FIG. 3C, each housing module 72, 74 is provided with tracks 76 running laterally (perpendicular to the direction of air flow) at an inner upper surface 78 of the housing 62. In the present embodiment, the tracks 76 are provided adjacent to each of the front and back openings 64, 66 of each housing module 72, 74. However, it will be understood by one of skill in the art that the tracks 76 may be positioned at other places within the housing 62.

As shown in FIG. 3A only, each of the housing modules 72, 74 may be provided with a lug 79 to allow each housing module 72, 74 to be lifted and moved.

Figure 4:
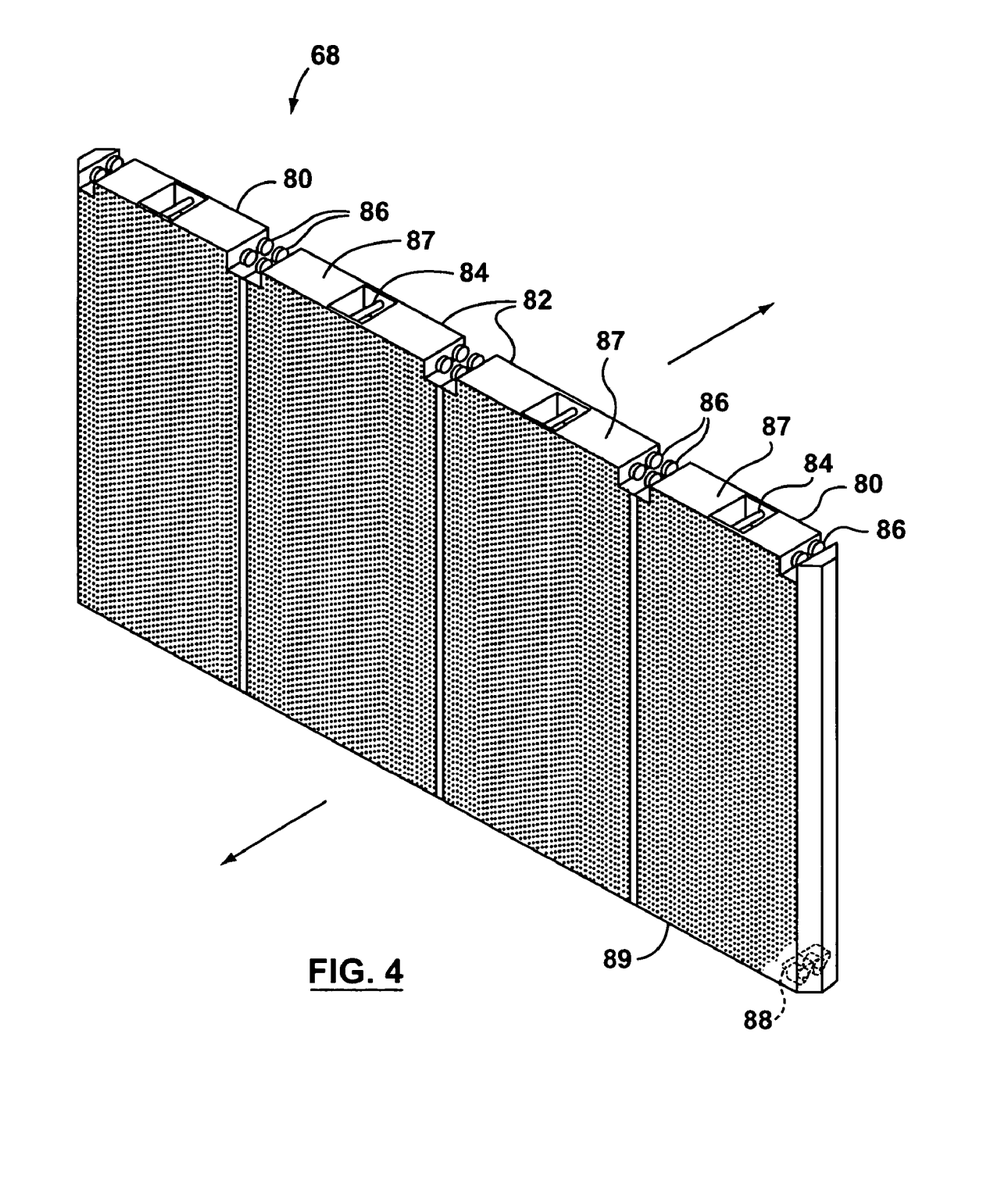
FIG. 4 is a perspective view of a baffle for the silencer of FIG. 3.

FIG. 4 is a perspective view of a baffle 68 according to an embodiment of the invention. As indicated above, the baffle 68 is divided into modules including two end modules 80 and two middle modules 82. Each baffle module 80, 82 is provided with a handle 84, which can be used for lifting and moving the baffle module 80, 82 when not in the housing 62. Each baffle module 80, 82 has roller assemblies 86 mounted at an upper portion 87 thereof which can be engaged with the tracks 76 in the housing 62 as described below. Each of the baffle modules 80, 82 also includes at least one caster assembly 88 at a lower portion 89 thereof to facilitate movement of the baffle 68, also as described below. (Only one caster assembly 88 is shown in hidden lines in FIG. 4.)

Figure 5:
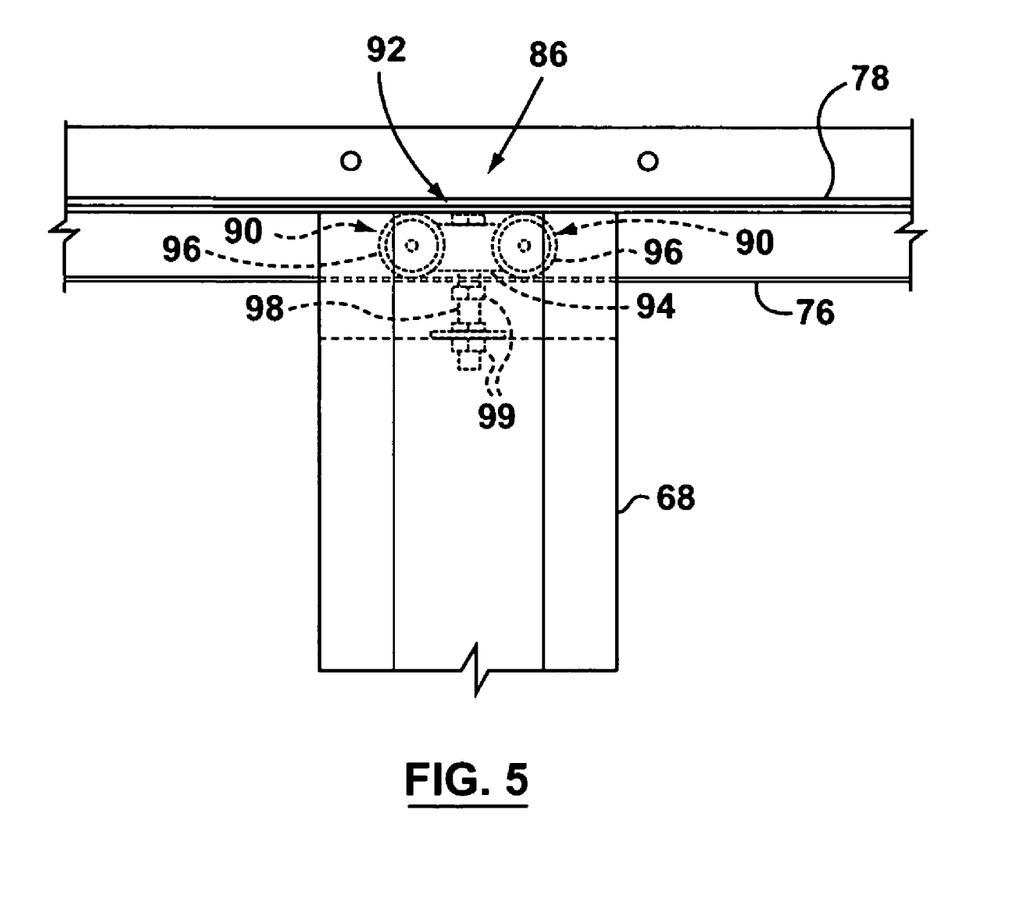
FIG. 5 is a side view of a roller assembly and track according to an embodiment of the invention.
Figure 6:
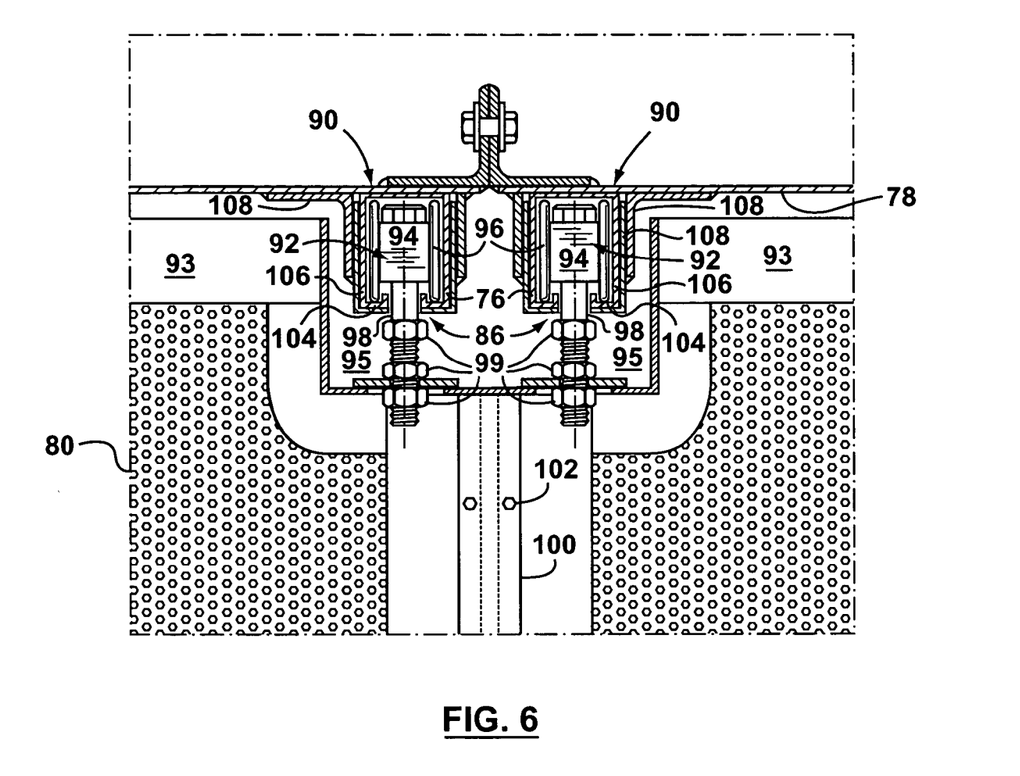
FIG. 6 is a detailed front view of the roller assembly and track of FIG. 5.

FIGS. 5 and 6 show detail views of the roller assembly 86 arranged in the track 76 on the upper inner surface 78 of the housing 62. FIG. 5 shows a side view of the roller assembly 86. FIG. 6 shows a front view of two adjacent roller assemblies 86 mounted in respective tracks 76.

In this particular embodiment, the roller assembly 86 includes a truck 92 and two roller sets 90. The truck 92 includes a generally rectangular frame 94 that supports the roller sets 90 such that the roller sets 90 are in-line in a direction in which the roller assembly 86 will move. Each roller set 90 includes an axle (not shown) and two rollers 96. The axel runs through the frame 94 and the rollers 96 are positioned on opposite sides of the frame 94.

The truck 92 further includes a bolt 98 for attachment to the baffle modules 80, 82. The bolt 98 may further be provided with nuts 99 which can be tightened or loosened to adjust the truck 92 and/or raise or lower the position of the baffles 68 in relation to the truck 92.

As shown in FIG. 6, each roller assembly 86 is provided at an upper corner 93 of the baffle modules 80, 82 in a recessed area 95 to allow the baffle to have a larger surface area. Baffle modules 80, 82 are also preferably connected to each other by, for example, a joiner bar 100 and joiner bolts 102, wherein the joiner bar 100 may be formed with grooves into which each baffle module 80, 82 fits forming a tongue and groove connection. It will be understood that the baffle modules 80, 82 may be supplied to the installation site as sections/modules 80, 82 or as assembled baffles 68, depending upon the particular application and factors such as space limitations or the like.

Referring again to FIG. 6, the track 76 is generally an inverted "U" shape with the base of the U-shape being attached to the housing 62. The track 76 is formed to have further "U"-shaped flanges 104 extending inward at the tips 106 thereof. The "U"-shaped flanges 104 are designed to provide a track in which the rollers 96 of the roller assembly 86 will run. The track 76 may be reinforced by brackets 108 or the like, if necessary to support the weight of the baffles 68. As indicated above, during assembly of the silencer 60, the roller assembly 86 is engaged within the track 76 to allow lateral movement of the baffles 68.

It will be understood that the roller assembly 86 is designed to adequately support the weight of the baffles 68 while still allowing lateral movement thereof. As such, the number of roller sets, size of rollers, configuration of track, reinforcement, and other factors may be varied in order to meet this requirement.

Figure 7:
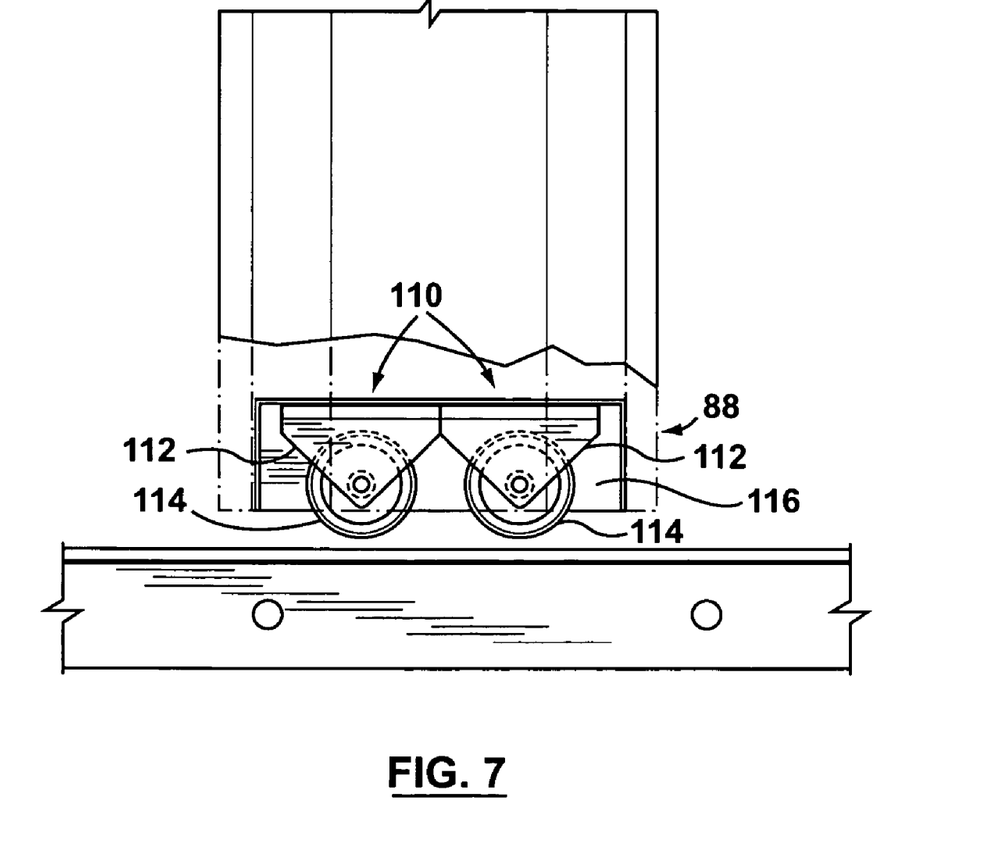
FIG. 7 is a front view of a caster assembly according to an embodiment of the invention.

FIG. 7 shows a detailed view of the caster assembly 88 of a baffle module 80, 82. In this embodiment, the caster assembly 88 includes two caster sub-assembles 110 which each include a caster frame 112 and a caster 114. The caster frame 112 supports the caster 114 and is mounted to the baffle module 80, 82. The caster sub-assemblies 110 are arranged adjacent to each other in a direction perpendicular to the air flow to assist with lateral movement of the baffle 68 and possible assist with supporting the weight of the baffle 68 during lateral movement. The caster assembly 88 is mounted in a recess 116 in the baffle module 80, 82 at the base thereof. In an alternate embodiment, the casters 114 may also move in a track (not shown) provided on the housing 62.

As in the embodiment above, during operation of the silencer according to the embodiments of the invention, it is preferable that each of the baffles be locked in place to prevent unintended movement. For example, by bolts (not shown) that pass through the housing and engage the baffles.

As described above, the ability to move the baffles 68 laterally within the housing 62 allows personnel to have access to the interior of the housing 62 so that the baffles 68 may be cleaned in situ.

After installation and operation of a silencer, the baffles will need to be cleaned. In order to clean the baffles in a silencer according to an embodiment of the invention, the locking mechanism is released and the lateral movement mechanism is used to slide the baffles to one side of the housing. The movement of the baffles allows the entry of cleaning personnel and/or equipment such as a vacuum cleaner nozzle, hose or vacuum cleaner itself. In an embodiment having side baffles, the cleaning personnel begin by cleaning the side baffle by applying vacuum suction over the surface thereof and will then proceed to vacuum a first side of the adjacent baffle. Following this vacuuming, the first baffle is moved adjacent to the now cleaned side baffle to expose the second side of the first baffle and a first side of the second baffle. These steps are repeated until each baffle has been vacuumed.

The ability to laterally move the baffles also allows personnel access to remove and clean or replace the noise absorbent material that is used within each of the baffles.

The noise absorbent material, sometimes formed into self-contained cleanable pillows, is relatively delicate and the ability to check whether or not it is in need of replacement without removing the baffles from the housing can reduce maintenance time and costs. Depending on the status of the noise absorbent material the noise absorbent material may also be vacuumed in situ or it may be removed from the baffles for cleaning outside of the housing.

It will be apparent to one skilled in the art that other arrangements providing for lateral movement of the baffles may be possible. For example, in the above embodiments, the lateral movement mechanism includes the roller assembly engaged with a track at the upper surface of the housing and the caster assembly provided at the base of each of the baffle materials. As an alternative, the lateral movement mechanism may involve a roller assembly and track at the base of the baffles and a caster or guide assembly at the upper portion of the baffles.

It will also be understood that in certain embodiments, it may be useful to further include motors or other mechanical means for laterally moving the baffles.

It should be recognized that the embodiments described herein and shown in the drawing figures are meant to be illustrative only and should not be taken as limiting the scope of invention. Those skilled in the art will recognize that the elements of the illustrated embodiments can be modified in arrangement and detail without departing from the spirit of the invention. Therefore, the invention as described herein contemplates all such embodiments and modified embodiments as may come within the scope of the following claims or equivalents thereof.

The invention claimed is:

1. A noise attenuator for gas flows, said noise attenuator comprising:
   a housing, said housing forming front and back openings through which said gas flows;
   one or more baffles provided within said housing, said one or more baffles arranged generally parallel to the direction of gas flow; and
   a lateral movement mechanism connected to said housing and said one or more baffles to allow at least one of said one or more baffles to move generally perpendicular to the direction of gas flow without removal from the path of gas flow.

2. The noise attenuator of claim 1, wherein said lateral movement mechanism comprises:
   a track mounted in said housing, said track running perpendicular to the direction of gas flow; and
   a roller assembly mounted on each of said one or more baffles to engage said track.

3. The noise attenuator of claim 2, wherein said lateral movement mechanism further comprises a caster assembly provided at a base of said one or more baffles.

4. The noise attenuator of claim 2, wherein said roller assembly comprises:
   a roller;
   a truck comprising a frame for supporting said roller and a bolt for mounting said truck to said baffle.

5. The noise attenuator of claim 1, further comprising a locking mechanism to prevent said one or more baffles from moving during operation of said noise attenuator.

6. The noise attenuator of claim 1, further comprising side baffles adapted to be provided adjacent to walls of said housing.

7. The noise attenuator of claim 1, wherein said housing and said one or more baffles are constructed in modular sections.

8. The noise attenuator of claim 1, further comprising a caster assembly provided at a base of said one or more baffles.

9. A noise attenuator for gas flows, said noise attenuator comprising:
   a housing, said housing forming front and back openings through which said gas flows;
   one or more baffles provided within said housing, said one or more baffles arranged generally parallel to the direction of gas flow;
   a track mounted to an inner upper surface of said housing, said track running perpendicular to the direction of gas flow; and
   a roller assembly mounted on each of said one or more baffles to engage said track to allow at least one of said one or more baffles to move along said track;
   a caster assembly provided at a base of said one or more baffles; and
   a locking mechanism to prevent said one or more baffles from moving during operation of said noise attenuator, wherein, when said locking mechanism is disengaged, said one or more baffles can move within said housing in a direction generally perpendicular to the direction of gas flow without removal from the path of gas flow.

10. The noise attenuator of claim 9, further comprising side baffles adapted to be mounted adjacent to walls of said housing.

11. The noise attenuator of claim 9, wherein said housing and said one or more baffles are constructed in modular sections.

12. A noise attenuator for gas flows, said noise attenuator comprising:
a housing, said housing forming front and back openings through which said gas flows;
one or more baffles provided within said housing, said one or more baffles arranged generally parallel to the direction of gas flow; and
a lateral movement mechanism connected to said housing and said one or more baffles to allow at least one of said one or more baffles to move in a direction substantially perpendicular to said one or more baffles.

13. The noise attenuator of claim 12, wherein said lateral movement mechanism comprises:
a track mounted in said housing, said track running perpendicular to the direction of gas flow; and
a roller assembly mounted on each of said one or more baffles to engage said track.

14. The noise attenuator of claim 13, wherein said lateral movement mechanism further comprises a caster assembly provided at a base of said one or more baffles.

15. The noise attenuator of claim 12, further comprising side baffles adapted to be provided adjacent to walls of said housing.

16. The noise attenuator of claim 12, wherein said housing and said one or more baffles are constructed in modular sections.

* * * * *